J. BOUR.
Evaporating Pan.
No. 18,172.
Patented Sept. 8, 1857.
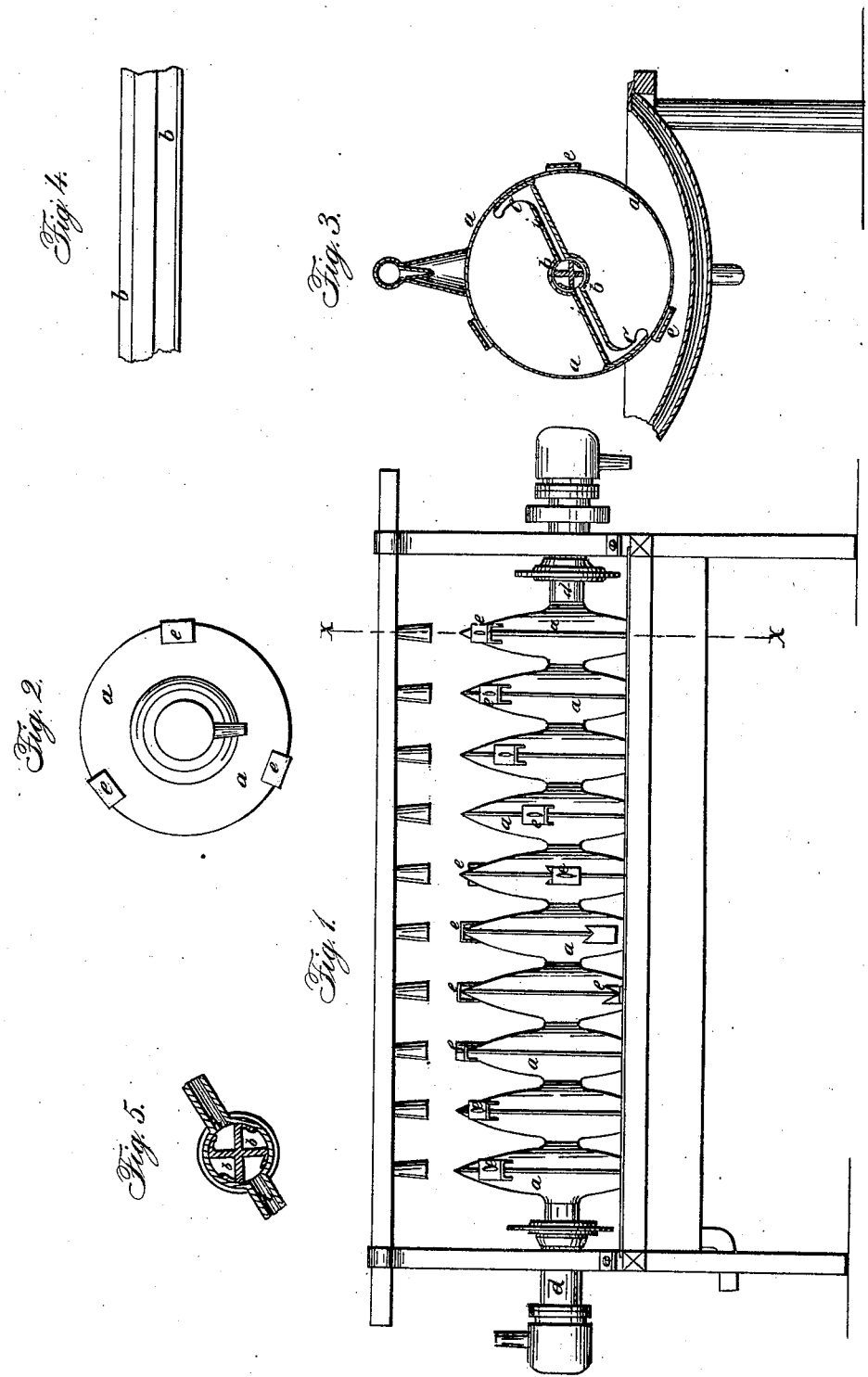

UNITED STATES PATENT OFFICE.

JOSEPH BOUR, OF NEW ORLEANS, ASSIGNOR TO CHARLES PARLANGE, OF POINT COUPÉE, LOUISIANA.

IMPROVEMENT IN SACCHARINE EVAPORATORS.

Specification forming part of Letters Patent No. 18,172, dated September 8, 1857.

*To all whom it may concern:*

Be it known that I, JOSEPH BOUR, of Forback, in the Kingdom of France, now a resident of New Orleans, parish of Orleans, State of Louisiana, have invented new and useful Improvements in Evaporating Saccharine Liquids; and I do hereby declare that the following is a full, clear, and exact description of the construction and operation of the same, reference being had to the annexed drawings, making a part of this specification, and to the description of said drawings.

The nature of my invention consists of a combination of hollow revolving vessels suitably constructed for being filled with and heated by steam. These hollow vessels, by their revolution and also by means of cups at their peripheries, carry up the liquid contained in the trough below, and in which the hollow vessels are partly immersed. The cups discharge the liquid over the heated surface of the hollow revolving vessels, and by these means the parts of the hollow vessels which are for the time being above the liquid in the trough or vessel below are covered with thin films of the liquid, and by reason of the heat of such surfaces the aqueous parts of the liquid are evaporated. Each hollow vessel is composed of two portions of a large sphere, which are connected together at their peripheries. The several hollow vessels are connected together at their centers, and in order to obtain stiffness at the centers to act as an axis, two bent or trough-like strips of metal are connected together, and they form open troughs in the central part of the combined hollow vessels, into which the water resulting from the condensation of the steam is raised by means of hollow arms with spoon-like ends, and the water flows off from the ends of these troughs through a hollow axis at one end of the apparatus. The steam to heat the apparatus is introduced at one end by a hollow axis, and flows off at the other end of the apparatus. The apparatus is caused to revolve slowly, and when the quantity of liquid first put into the trough below has arrived at the desired degree of concentration, streams of the liquid which has not been concentrated are allowed to flow from above onto each heated hollow vessel till the trough is filled to the desired height with concentrated liquid. The steam employed is the waste steam from a high-pressure steam-engine used for crushing the sugar-cane.

Having thus stated the nature of my said invention, I will proceed to describe the manner of performing the same.

In the drawings, Figure 1 shows an external view of an apparatus constructed according to my invention, consisting of ten hollow vessels connected together at their centers; but the apparatus according to my invention may be made with other numbers of such vessels *a a a*. Each of these vessels is made of two convex parts joined at the edges, and the neighbouring parts are joined at the centers, there being an opening through each part at the center for that purpose. Fig. 2 shows a side view of one of the vessels *a* separately. Fig. 3 shows an interior view of one of the vessels *a*. Fig. 4 shows the means by which stiffness is given to the central axis of the apparatus, and by which troughs are provided for carrying off the water resulting from the condensed steam when such water is brought into the center of the apparatus, as hereinafter described. Fig. 5 shows an end view of Fig. 4. This central axis is made by connecting together two plates, *b b*, turned at the edges, so as to form angular troughs *b b*, and at the same time a light and stiff interior axis for the several vessels *a a*. On the interior of each vessel *a* two tubular arms are fixed to the axis *b b*, and such arms have spoon-like ends C, which in their revolution, when at the lowest position, receive the water in their respective vessels and carry it up so that it runs from the spoon-like ends C through the tubular arms into the troughs *b*, and thence away through the hollow axis at the end.

*d d* are hollow axes or necks fixed to the said vessels *a a* of the series. These necks or axes turn in suitable bearings. Steam is admitted through the hollow axis at one end, and the water is allowed to flow off at the other end of the apparatus down a pipe placed with its upper end so as to cover the end of the tubular or hollow axis *d* at the end of the vessels *a a*. The end of the axis *d* where the steam is admitted turns in a stuffing-box, so as to render that end steam-tight, though the steam is represented as making its entrance to the vessels *a a a* at the extremity of the series of said vessels. I do not wish to confine my arrangement to that position of the steam-entrance, as I may find it advantageous to allow the steam to enter about the center of the series of vessels *a a*, in order that the heat imparted to said vessels may be more equally distributed.

In the peripheries of each of the vessels *a a* there are cups or vessels *e e* affixed, which are opened at one end and closed at the other. These vessels or cups *e e*, as the vessels *a a* revolve, dip into and pass below the surface of the saccharine fluid contained in an open pan or vessel, and they raise up quantities of the fluid, and as they come up they pour out such fluid over the surfaces of their respective vessels *a*, so that in addition to any quantity of the liquid which will be taken up by the simple revolution of the lower parts of the vessels *a a* in the liquid there will be quantities taken up by the cups or vessels *e e*, which will be distributed over the heated portions of the vessels *a a* which do not descend into the liquid.

It will be observed by reference to Fig. 3 that the trough or pan A is made double, for the purpose of admitting steam, in the same manner as the vessels *a a a*, though this arrangement is not of great importance by merely a modification of the pan shown in Fig. 1. The vessels *a a*, it is preferred, should be of sheet-copper, and composed of parts of spheres, as shown. The saccharine fluid to be concentrated is to be placed in a suitable trough or pan below the series of vessels *a*, and in such a manner that the lower parts of the peripheries of the vessels *a a* may dip into the liquid to the extent of a few inches.

Having thus described the nature of my said invention and the manner of performing the same, I would state that I am aware that it is not new to cause liquids to be evaporated by the movement of surfaces into and from them when placed in open vessels, various forms of apparatus for that purpose having before been proposed and used. In some cases the surfaces have been hollow and heated by steam internally, and in others the liquid has been heated, and I mention these matters in order to state that I do not claim to evaporate liquids by such means unless the apparatus be constructed and combined according to my improvements herein described; and I wish it to be well understood that

What I claim is—

The combination of a series of hollow vessels, *a a*, such as herein described, with apparatus on the interior thereof for raising the water to and passing it off by the central axis, and the further combination of such like surface *a a* with vessels or apparatus, *e e*, for raising the liquid to be evaporated and distributing the same over the exterior of the revolving surfaces, as described.

J. BOUR.

Witnesses:
 EDUD. DUPLISSIR,
 JAMES JONES.